United States Patent [19]

Sobhani et al.

[11] Patent Number: 4,979,068
[45] Date of Patent: Dec. 18, 1990

[54] HIGH SPEED ELECTRONIC CIRCUIT BREAKER

[76] Inventors: Seyd M. Sobhani, 1902 Duvall Ave., NE., Renton, Wash. 98056; Anthony O. Thomas, 3303 E. Denny Way, Seattle, Wash. 98122

[21] Appl. No.: 306,914

[22] Filed: Feb. 7, 1989

[51] Int. Cl.$^5$ ............................................. H02H 3/20
[52] U.S. Cl. ................................. 361/18; 361/86; 361/91; 361/111
[58] Field of Search ...................... 361/10, 18, 58, 86, 361/88–90, 111, 91, 101

[56] References Cited

U.S. PATENT DOCUMENTS

| | | | |
|---|---|---|---|
| 3,809,999 | 5/1974 | Smith | 361/18 X |
| 3,851,218 | 11/1974 | York | 317/33 R |
| 3,988,643 | 10/1976 | Morris | 361/18 |
| 4,127,885 | 11/1978 | Adam et al. | 361/18 |
| 4,360,851 | 11/1982 | Zundel | 361/59 |
| 4,429,339 | 1/1984 | Jaeschke et al. | 361/93 |
| 4,430,682 | 2/1984 | Babsch | 361/31 |
| 4,475,139 | 10/1984 | Chadwick | 361/91 |
| 4,600,963 | 7/1986 | Hertrich et al. | 361/101 |
| 4,849,847 | 7/1989 | McIver et al. | 361/86 X |

*Primary Examiner*—Todd E. Deboer
*Attorney, Agent, or Firm*—Thomas W. Hennen

[57] ABSTRACT

An electronic circuit breaker has a switching transistor for controlling current flow in a circuit. The switching transistor is controlled by a pair of complementary field-effect transistors to achieve very fast switching action. The electronic breaker is capable of sensing an overcurrent condition and interrupting current flow in less than a microsecond. The electronic circuit breaker also has an inductor for limiting the rate at which current can increase during the time delay between sensing an overcurrent and interrupting current flow.

1 Claim, 1 Drawing Sheet

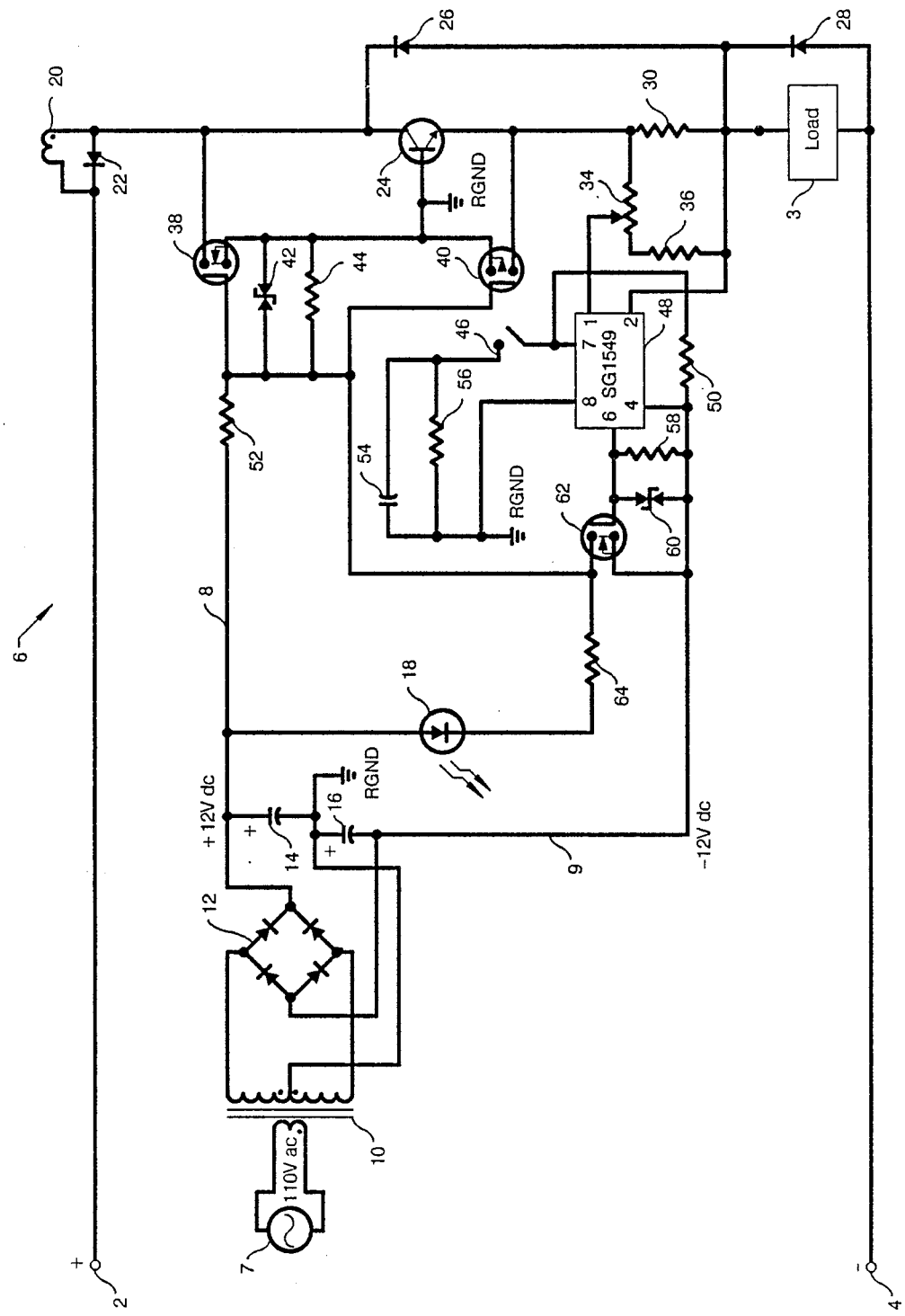

HIGH SPEED ELECTRONIC CIRCUIT BREAKER

FIELD OF THE INVENTION

This invention relates to circuit breakers and, more particularly, to a high speed electronic circuit breaker which provides overcurrent protection.

BACKGROUND OF THE INVENTION

Circuit breakers are used extensively to prevent excessive current from flowing through electrical circuits and thereby damaging circuit components. Well known circuit breakers include fuses and electro-mechanical circuit breakers which physically open the circuit by disconnecting the power supply from the circuit components to be protected in response to excessive currents.

In the operation of fuses and electro-mechanical circuit breakers, there is a relatively long time period between the occurrence of the overcurrent and actual interruption of current flow. As a result, when fuses and electro-mechanical circuit breakers are relied upon for protection, overcurrents often damage sensitive circuit components before the circuit is opened. In addition, fuses and electro-mechanical circuit breakers are either destroyed or subject to mechanical wear when opening a circuit and must be replaced frequently.

In recent years, the use of electronic circuit breakers has become increasingly prevalent due to the increased speed and absence of mechanical wear afforded by solid state circuitry. Present electronic circuit breakers are capable of sensing an overcurrent and interrupting current flow in several microseconds. However, even exposure to several microseconds of a relatively small overcurrent can damage very sensitive circuit components.

Therefore, a need exists for a high speed electronic circuit beaker which has a response time of under one microsecond.

In addition, there is an inherent time delay in electronic circuit breakers between the sensing of an overcurrent and the actual interruption of current flow. Present electronic circuit breakers do not limit the rate at which the current can increase during this time delay. Consequently, in present circuit breakers current can increase dramatically during this time delay resulting in extremely large values of overcurrent capable of damaging even circuit components designed to handle high power.

Therefore, a need exists for an electronic circuit breaker which limits the rate at which the current can increase during the time delay between the sensing of an overcurrent and interruption of current flow.

SUMMARY OF THE INVENTION

It is an object of the invention to provide a high speed electronic breaker capable of sensing an overcurrent condition and interrupting current flow in less than a microsecond.

It is also an object of the invention to provide an electronic circuit breaker which limits increases in current during the time interval between sensing overcurrent and interrupting current flow.

These and other objects are achieved by the circuit breaker of the present invention. The circuit breaker includes a switching transistor which permits current flow between first and second terminals when on and interrupts current flow between the first and second terminals when off. A first FET (field-effect transistor) has its source connected to the base of the switching transistor and its drain connected to the collector of the switching transistor. A second FET has its source connected to the base of the switching transistor and its drain connected to the emitter of the switching transistor.

A control circuit is connected to the gates of the first and second FETs and produces first and second control signals. The first control signal turns the second FET off and the first FET on to turn the switching transistor on and permit current to flow between the first and second terminals. The second control signal turns the first FET off and the second FET on to quickly turn the switching transistor off and interrupt current flow between the first and second terminals.

The circuit breaker also includes a means connected between the first and second terminals which limits the rate at which the current flow between the first and second terminals can increase.

BRIEF DESCRIPTION OF THE DRAWING

The FIG. is an electical schematic diagram of a preferred embodiment of the invention.

DETAILED DESCRIPTION OF THE DRAWING

The FIG. shows a preferred embodiment of an electronic circuit breaker 6 in accordance with the invention. Circuit breaker 6 protects a load 3 from overcurrents which may flow from positive terminal 2 to negative terminal 4 of a DC power supply, not shown, by sensing current flow to load 3 and, when the sensed current exceeds a predetermined limit, interrupting the current flow.

Circuit breaker 6 also limits the rate at which the current flow to load 3 can increase during the time delay between sensing the overcurrent and interrupting the current flow to provide additional protection to load 3.

Circuit breaker 6 includes a power supply comprising a 110 volt AC power supply 7, a step-down transformer 10, a rectifier 12, filter capacitors 14 and 16, positive supply line 8, and negative supply line 9. Step-down transformer 10 is connected between 110 volt AC power supply 7 and rectifier 12, for supplying a stepped down voltage to rectifier 12. The output of rectifier 12 is filtered by capacitors 14 and 16 which are connected between line 8 and ground and line 9 and ground, respectively, to provide +12 volts DC on line 8 and −2 volts DC on line 9.

The gates of complementary field-effect transistors 38 and 40 and the drain of field-effect transistor 62 are connected to line 8 through a resistor 52. As shown in the FIG., transistors 38 and 62 are preferably N-channel enhancement MOSFETs and transistor 40 is preferably a P-channel enhancement MOSFET. Back-to-back zener diode 42 and resistor 44 are connected across the gate and source of transistors 38 and 40. Back-to-back zener diode 42 suppresses transient voltages to inhibit gate breakdown. Resistor 44 causes the gates of transistors 38 and 40 to be low impedance points in order to increase noise immunity.

The sources of transistors 38 and 40 are connected in common to ground and to the base of switching transistor 24. The drain of transistor 38 is connected to the collector of transistor 24, while the drain of transistor 40 is connected to the emitter of transistor 24. Switching transistor 24 controls the flow of current to load 3 and is preferably an NPN transistor, as shown in the FIG., with the ability to carry high currents and block high voltages.

Transistors 38 and 40 control the on-off state of switching transistor 24 in response to control signals applied to their gates. When the control signal applied to the gates of transistors 38 and 40 is high, transistor 40 is off while transistor 38 is on to short the base and collector of transistor 24. This turns transistor 24 on while preventing operation of transistor 24 in the saturation region. When the control signal goes low, transistor 38 turns off and transistor 40 turns on to short the base and emitter of transistor 24, thus rapidly turning transistor 24 off. Transistors 38 and 40 provide switching transistor 24 with a very fast switching action and raise noise immunity to ±12 volts.

The level of the control signal applied to the gates of transistors 38 and 40 is dependent upon the magnitude of the current flowing to load 3 from terminal 2 to terminal 4. A resistive network connected between the emitter of transistor 24 and load 3 senses the level of the current flowing to load 3. This network includes a resistor 30 having one terminal connected to the emitter of transistor 24 and the other terminal connected in common to load 3 and pin 2 of current sensing latch 48. The network also includes serially connected variable resistor 34 and resistor 36 which are connected in parallel with resistor 30. The wiper of variable resistor 34 is connected to pin 1 of current sensing latch 48.

The voltage across pins 1 and 2 of current sensing latch 48 is proportional to the current flowing to load 3. When the voltage across pins 1 and 2 of current sensing latch 48 is less than a threshold level, the output signal on pin 5 is low. When the voltage across pins 1 and 2 of current sensing latch 48 reaches the threshold level, the output signal on pin 5 latches to a high value. The particular magnitude of the current to load 3 at which pin 5 of current sensing latch 48 latches high is selected by adjusting the position of wiper 35 of variable resistor 34. Variable resistor 34 thus permits the current limit at which circuit breaker 6 interrupts current flow to be adjusted in accordance with the requirements of the particular load 3 to be protected.

Pin 5 of current sensing latch 48 is connected to the base of transistor 62. Transistor 62 is off until current sensing latch 48 provides a high output signal on pin 5, at which time transistor 62 turns on.

When transistor 62 is off, the gates of transistors 38 and 40 receive a high control signal via line 8 and resistor 52 causing transistor 38 to be on and transistor 40 to be off. This shorts the base and collector of transistor 24 to turn it on and permit current to flow to load 3.

When transistor 62 turns on, the control signal applied to the gates of transistors 38 and 40 goes low to turn transistor 38 off and transistor 40 on. This shorts the base and emitter of transistor 24 to quickly turn transistor 24 off and interrupt the current flow to load 3.

A back-to-back zener diode 60 is connected between the gate and source of transistor 62 to suppress transient voltages. A resistor 58 is connected between the gate and source of transistor 62 to increase noise immunity by causing the gate of transistor 62 to be a low impedance point.

An LED 18 and resistor 64 are connected in series between line 8 and the drain of transistor 62. LED 18 conducts when transistor 62 is on to provide a visual indication that current flow to load 3 has been interrupted. Resistor 64 limits the current through LED 18 to its current rating.

A reset switch 46 is connected to pin 7 of current sensing latch 48. Resistor 50 has one terminal connected in common to line 9 and pin 4 of current sensing latch 48. The other terminal of resistor 50 is connected to pin 7 of current sensing latch 48. When reset switch 46 is closed, pin 7 is connected to ground through capacitor 54 and resistor 56 which are connected in parallel. Closing reset switch 46 after current sensing latch 48 has sensed an overcurrent and the output signal on pin 5 has latched high resets current sensing latch 48 to cause the output signal on pin 5 to go low. As a result, transistor 62 is turned off causing the control signal applied to the gates of transistors 38 and 40 to go high. This turns transistor 40 off and transistor 38 on shorting the collector and base of transistor 24 and turning transistor 24 on to permit current to flow to load 3.

An inductor 20, connected between positive terminal 2 of the DC supply and the collector of transistor 24, limits the rate of change of the current to load 3. The value of inductor 20 is chosen so as to prevent excessive increases in current to load 3 in the short delay time between the sensing of an overcurrent by current sensing latch 48 and the complete turning off of transistor 24. For example, where the supply voltage is 300 volts DC and an acceptable rate of increase is 5 amperes/usec, a suitable value for inductor 20 would be:

$$L = (300 \text{ volts})/(5 \text{ amperes/usec}) = 60 \mu H$$

A diode 22 is connected in parallel with inductor 20. The anode of diode 22 is connected to the collector of transistor 24 while the cathode of diode 22 is connected to terminal 2 of the DC power supply. A diode 26 is connected in parallel with transistor 24 and resistor 30. The anode of diode 26 is connected between resistor 30 and load 3 while the cathode of diode 26 is connected to the collector of transistor 24. A diode 28 is connected in parallel with load 3. The anode of diode 28 is connected to terminal 4 of the DC power supply while the cathode is connected to between resistor 30 and load 3. Diodes 22, 26, and 28 provide a path for any reverse currents which may flow toward terminal 2 of the DC power supply to protect load 3 and circuit breaker 6.

Operation of circuit breaker 6 during normal and overcurrent conditions will now be described. During normal conditions, transistor 24 is on to permit current to flow to load 3. The current flowing to load 3 is less than the limit set by wiper 35 on variable resistor 34. Consequently, the voltage across pins 1 and 2 of current sensing latch 48 is less than the threshold level and the output signal on pin 5 is low. Transistor 62 is therefore off and the control signal applied to the gates of transistors 38 and 40 via line 8 and resistor 52 is high. Transistor 40 is off and transistor 38 is on which shorts the collector and base of transistor 24 to maintain transistor 24 on.

During an overcurrent condition, the current flowing to load 3 reaches the limit set by wiper 35 on variable resistor 34. Current sensing latch 48 therefore senses a voltage across pins 1 and 2 which is equal to the threshold level causing the output signal on pin 5 to latch high. The high output on pin 5 turns transistor 62 on which causes the control signal applied to the gates transistors 38 and 40 to go low. As a result, transistor 38 turns off and transistor 40 turns on to short the base and emitter of transistor 24 to quickly turn off transistor 24 and interrupt current flow to load 3. Inductor 20 limits the rate at which current to load 3 can increase during the time delay between sensing the overcurrent and turning transistor 24 off completely.

When the cause of the overcurrent has been corrected current flow to load 3 can be resumed by closing reset switch 46 to reset current sensing latch 48. Examples of values or part numbers of the components which may be used in circuit breaker 6 are:

Transistors:
24: G3RU 20040
38: IRF 450
IRFF: 9130
IRFF: 130
    Current sensing latch:
48: SG1549
    Step-down transformer:
10: 110V–14V 500ma
    TRAIAD F-45X
    Rectifier:
12: DF04M
    LED:
18: DIALCO 550-0406
    Back-to-back Zener diodes
42: IN6045
60: IN6045
    Diodes:
22: UES 706
26: UES 706
28: UES 706
    Capacitors:
14: 500μF 50V
16: 500μF 50V
54: 0.01μF 50V
    Resistors:
30: 0.05 ohm
34: 100 ohm
36: 100 ohm
44: 1K ohm
50: 100 ohm
56: 1K ohm
58: 1K ohm
64: 2K ohm
    Inductor:
20: 60 μH A circuit constructed with the values and part numbers mentioned above and operating under worst case conditions with a DC supply voltage of 300 volts and a short load will have a turn off time of about 500 nanoseconds.

Although only a preferred embodiment has been specifically described, it will be understood that many modifications of the present invention are possible without departing from the spirit and scope of the invention.

We claim:

1. A circuit breaker for controlling current flow between first and second terminals connected to a power supply, comprising:
    a switching transistor, having a base, a collector, and an emitter, and permitting current flow between the first and second terminals when on and interrupting current flow between the first and second terminals when off;
    a first field-effect transistor having a gate, a source connected to the base of the switching transistor, and a drain connected to the collector of the switching transistor;
    a second field-effect transistor having a gate, a source connected to the base of the switching transistor, and a drain connected to the emitter of the switching transistor; and
    a control means connected to the gates of the first and second field-effect transistors for producing a first control signal which turns the second field-effect transistor off and the first field-effect transistor on to turn the switching transistor on when the magnitude of the current flowing between the first and second terminals is less than a predetermined limit and a second control signal which turns the first field-effect transistor off and the second field-effect transistor on to turn the switching transistor off when the magnitude of the current reaches the predetermined limit, the control means further comprising:
    a current sensing means for producing a voltage signal related to the magnitude of the current flowing between the first and second terminals;
    a latch means responsive to the voltage signal for producing an output signal which ha a first value when the voltage signal is less than a threshold level and which latches to a second value when the voltage signal reaches the threshold level;
    a power supply having positive and negative supply lines; and
    a third field effect transistor having a gate connected to the latch means to receive the output signal, a source connected to the negative supply line, and a drain connected to the gates of the first and second field-effect transistors and to the positive supply line, the third field effect transistor turning off in response to the output signal of the first value to cause the first control signal to be applied to the gates of the first and second field-effect transistors and turning on in response to the output signal of the second value to cause the second control signal to be applied to the gates of the first and second field-effect transistors.

* * * * *